Dec. 31, 1946.　　　　R. R. STEVENS　　　　2,413,390
CONTROL APPARATUS
Filed May 31, 1944　　　　3 Sheets-Sheet 1

Fig. 1

INVENTOR
Roy R. Stevens
BY
ATTORNEY

Fig.1-A

Dec. 31, 1946.        R. R. STEVENS        2,413,390
CONTROL APPARATUS
Filed May 31, 1944        3 Sheets-Sheet 3

INVENTOR
Roy R. Stevens
BY
ATTORNEY

Patented Dec. 31, 1946

2,413,390

UNITED STATES PATENT OFFICE 2,413,390

CONTROL APPARATUS

Roy R. Stevens, Forest Hills, Pa., assignor to The Westinghouse Air Brake Company, Wilmerding, Pa., a corporation of Pennsylvania Application May 31, 1944, Serial No. 538,183

12 Claims. (Cl. 60—16)

This invention relates to control apparatus and more particularly to the fluid pressure type.

The principal object of the invention is the provision of a fluid pressure control apparatus which is operable automatically in response to appropriate operations of a manually operative controller, to control a plurality of different operations in a desired sequence, such for example, as are incident to controlling the starting, stopping and reversing of, and the supply of fuel to a reversible internal combustion engine, such as of the Diesel type.

Other objects and advantages will be apparent from the following more detailed description of the invention.

In the accompanying drawings.

Description

Figure 1:
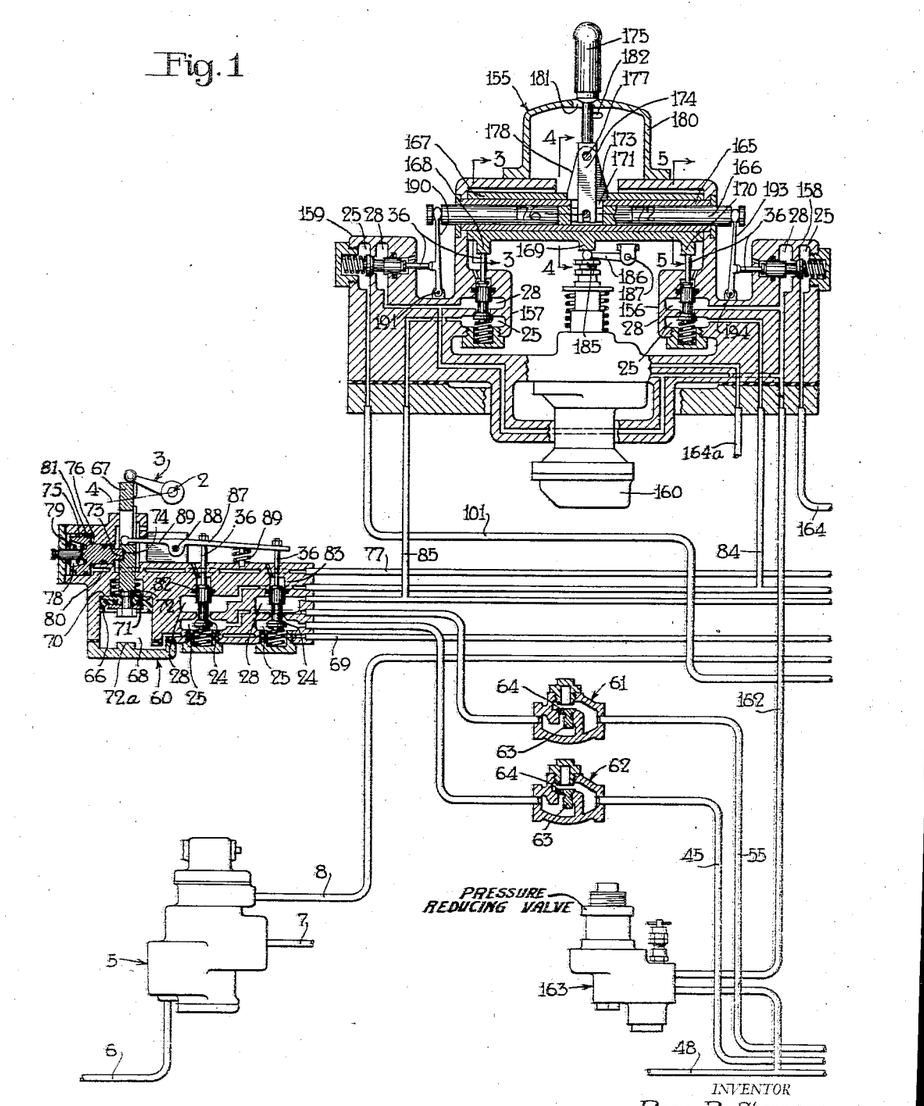
Figs. 1, 1—A, when taken together with the right-hand edge of Fig. 1 matched against the left-hand edge of Fig. 1—A, is a diagrammatic view, mainly in section, of a fluid pressure control apparatus embodying the invention.
Figure 1A:
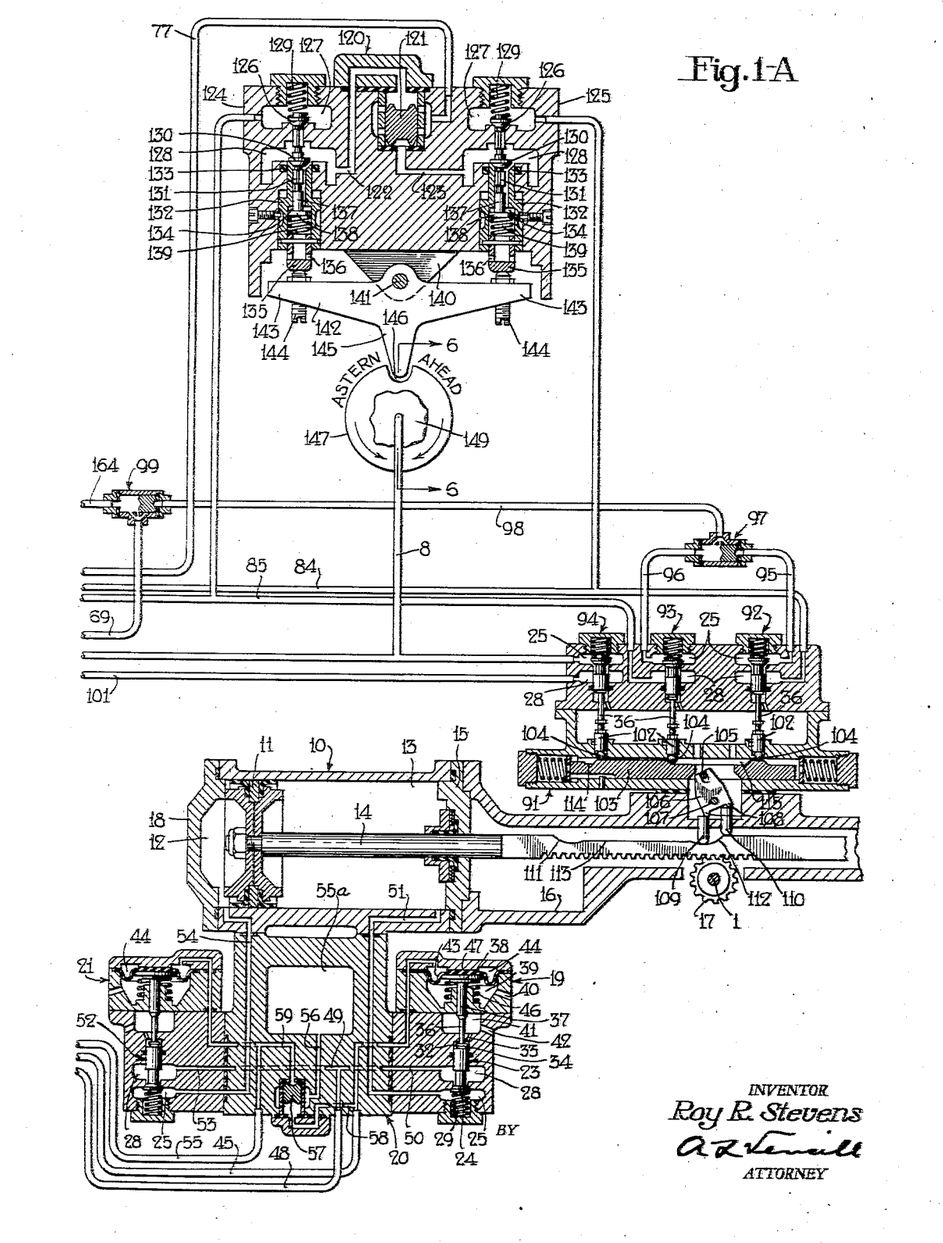

In the drawings, the reference numeral 1 indicates a reversing control shaft of a reversible internal combustion engine, such as of the Diesel type, and this shaft may be connected to any conventional engine reversing means, such as a longitudinally movable cam shaft for reversing the valve gear or valve timing of the engine. Rotation of the reversing shaft 1 in a counterclockwise direction, as viewed in and to the position shown in the drawings, will condition the valve gear or timing to provide for operation of the engine in one or an astern direction, while rotation in the opposite direction to another position will condition said gear or timing to provide for operation of said engine in the opposite or an ahead direction.

The reference numeral 2 indicates a fuel control shaft of the above-mentioned engine, and the numeral 3 indicates a lever connected to said shaft for turning same to either of two positions, namely, a fuel cutoff position in which it is shown in the drawings, for cutting off the supply of fuel to the engine to cause stopping of the engine, and a fuel supply position indicated by a line 4, for supplying fuel to the engine to allow operation thereof at a speed determined by the adjustment of the usual speed governor (not shown) associated with engines of this type.

The engine may be of the type in which compressed air is employed for starting, and the supply of such air to the engine may be controlled by any conventional starting air or relay valve device, such for example, as indicated in the drawings by the reference numeral 5. To this starting air valve device are connected a starting air supply pipe 6, a pipe 7 for conveying starting air to the engine, and a control pipe 8. Upon supply of fluid under pressure to pipe 8 the starting air valve device 5 will operate to supply starting air from pipe 6 to pipe 7 to cause starting of the engine, while upon release of fluid under pressure from the control pipe 8 the supply of starting air to pipe 7 will be cut off and said pipe may be vented. The control of the supply and release of fluid under pressure to and from pipe 8 will be hereinafter described.

The reference numeral 9 (Fig. 6) indicates an end portion on any rotatable part of the engine, such as the crank shaft, which rotates in a direction determined by the direction of operation of the engine. With the engine operating in one direction the crank shaft 9 will, therefore, turn in a corresponding direction and upon operation of the engine in a reverse direction the crank shaft 9 will also turn in the reverse direction.

For turning the reversing shaft 1 to its different positions to provide for operation of the engine in either one or the opposite direction there is provided a fluid motor 10 which comprises a casing containing a piston 11 having at one side a pressure chamber 12 and at the opposite side a pressure chamber 13. The piston 11 has a rod 14 projecting through chamber 13 and through a pressure head 15 closing the end of said chamber and into a casing member 16 secured to the outer face of the pressure head 15. Within the casing member 16 the rod 14 is provided on one side with gear teeth meshing with teeth on a gear wheel 17 which is mounted on and secured to the reversing shaft 1 for turning same upon reciprocation of piston 11. With piston 11 in the position shown in the drawings and defined by contact of the piston with a pressure head 18 closing the end of chamber 12, the reversing shaft 1 will be turned to the position shown in the drawings to condition the engine valve gear or valve timing to provide for starting and running of the engine in the astern direction, while upon movement of said piston to a position defined by contact of the piston with the pressure head 15 the reversing shaft 1 will be turned to its other position to condition the valve gear or timing of the engine to provide for operation thereof in its ahead direction.

Movement of piston 11 to the position shown in the drawings is arranged to be effected by supplying fluid under pressure to pressure chamber 13 to act on one side of the piston with fluid under pressure released from chamber 12 at the opposite side of the piston, while movement of the piston to the position defined by contact with pressure head 15 is arranged to be effected by supplying fluid under pressure to chamber 12 with fluid under pressure released from chamber 13.

The supply and release of fluid under pressure to and from chamber 13 is controlled by an astern pilot valve device 19 mounted on one side of a bracket 20 depending from the fluid motor casing, while the supply and release of fluid under pressure to and from pressure chamber 12 is arranged to be controlled by an ahead pilot valve device 21 mounted on the opposite side of said bracket.

Figure 7:
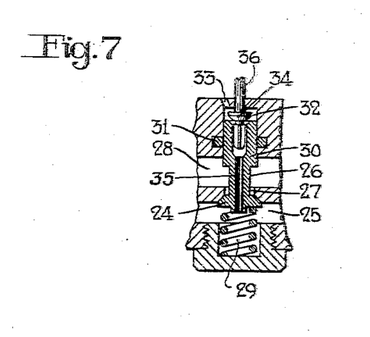
Fig. 7 is a cross-sectional view of a supply and release valve structure several of which are shown in side elevational in Figs. 1, 1—A.

The astern pilot valve device 19 comprises a supply and release valve structure 23 which is shown in section and on an enlarged scale in Fig. 7. This structure comprises a supply valve 24 contained in a chamber 25 and having a stem 26 loosely extending through an opening 27 connecting said chamber to a chamber 28. The valve 24 is arranged to engage a seat in chamber 25 provided around the opening 27 for closing communication between said chamber and chamber 28 and is movable out of contact with said seat for opening said communication. A spring 29 in chamber 25 acts on the supply valve 24 for urging same into contact with its seat.

In chamber 28 the supply valve stem 26 is connected to a guide 30 of enlarged diameter which is slidably mounted in a bore in the casing. The casing is provided with an annular recess encircling the guide 30 and containing a sealing ring 31 having sealing and sliding contact with said guide for preventing leakage of fluid under pressure from chamber 28 past said guide to a chamber 32 provided at the end of said guide opposite the supply valve 24. Chamber 32 is in constant communication with atmosphere through a port 33 and contains a fluid pressure release valve 34 arranged to cooperate with a seat provided on the end of guide 30 for controlling communication between chamber 32 and a bore 35 extending through the guide 30, the valve stem 26 and the supply valve 24 and opening at its opposite end to chamber 25. The release valve 34 is provided with a stem 36 which is mounted to slide in a suitable bore in the casing.

In the astern pilot valve device 19 the end of the release valve stem 36 is engaged by a stem 37 projecting from a diaphragm follower 38 contained in a chamber 39 which is in constant communication with atmosphere through a passage 40. The stem 37 is slidably mounted in a suitable bore in the casing and its end contacting the release valve stem 36 is disposed in a chamber 41 also open to atmosphere through a passage 42. Passage 33 above mentioned is open to atmospheric chamber 41.

The chamber 39 is formed at one side of a flexible diaphragm 43, which side also contacts the follower 38. At the opposite side of diaphragm 43 is a control chamber 44 which is connected to a control pipe 45. In chamber 39 a bias spring 46 acts on follower 38 for urging same and diaphragm 43 to a position defined by contact between said diaphragm and a stop 47 in the casing. With diaphragm 43 and follower 38 in this position, spring 29 is adapted to seat the fluid pressure supply valve 24 and the release valve 34 is arranged to be open as shown in Fig. 7. Movement of diaphragm 43 and follower 38 from this position in the direction of chamber 39 to a position defined by contact between said follower and the casing causes the release valve 34 to move into seating engagement with the guide 30 and to then act through said guide to open the supply valve 24.

In the astern pilot valve device 19 chamber 28 is arranged to be constantly supplied with fluid under pressure from a fluid pressure supply pipe 48 through a passage 49 in bracket 20 and a passage 50 in said device, while chamber 25 is connected by a passage 51 to pressure chamber 13 at one side of the power piston 11. In operation, when fluid is supplied to the control pipe 45 and thence to chamber 44 above diaphragm 43 at a pressure which overcomes the opposing pressure of spring 46, the diaphragm 43 will deflect to close the release valve 34 and to open the supply valve 24 whereupon fluid under pressure will flow from the supply pipe 48 to passage 51 leading to pressure chamber 13 at one side of the power piston 11, while upon release of fluid under pressure from the control pipe 45 and diaphragm chamber 44, spring 46 will move follower 38 and diaphragm 43 to the position in which they are shown in the drawings to permit closing of the supply valve 24 by spring 29 and opening of the release valve 34 by pressure of fluid effective in chamber 25, whereupon fluid under pressure will be released from the pressure chamber 13 to the atmosphere.

The ahead pilot valve device 21 is structurally identical to the astern pilot valve device 19 and briefly comprises a supply and release valve structure 52 like the valve structure 23 shown in Fig. 7. In this valve structure 52 chamber 28 is constantly supplied with fluid under pressure from the supply pipe 48 by way of passage 49 and a passage 53. Chamber 25 in this valve structure is connected by a passage 54 to pressure chamber 12 at the lefthand side of the power piston 11. Diaphragm chamber 44 in the ahead pilot valve device 21 is connected to an ahead control pipe 55. It will thus be seen that upon supply of fluid under pressure to pipe 55 the ahead pilot valve device 21 will operate to supply fluid under pressure from the supply pipe 48 to pressure chamber 12 at the left-hand side of the power piston 11, while upon release of fluid under pressure from the control pipe 55 fluid under pressure will be released from said pressure chamber.

It will now be seen that when the ahead control pipe 55 is vented to atmosphere, in a manner which will be later described, causing opening of pressure chamber 12 to atmosphere, if fluid under pressure is supplied to the astern control pipe 45, the astern pilot valve device 19 will operate to supply fluid under pressure to pressure chamber 13 at the opposite side of the power piston to thereby create a differential in fluid pressures on said piston which will effect movement thereof to the position shown in the drawings for thereby positioning the reversing shaft 1 to provide for operation of the engine in the astern direction.

On the other hand, if fluid under pressure is supplied to the ahead control pipe 55 when the astern control pipe 45 and the connected pressure chamber 13 are open to atmosphere, in a manner which will be later described, the ahead pilot valve device 21 will act to supply fluid under pressure to pressure chamber 12, whereupon the power piston 11 will be moved from the position in which it is shown in the drawings to its opposite position defined by contact of the piston with pressure head 15 to thereby condition the reversing shaft 1 to provide for operation of the engine in the opposite or ahead direction.

When both of the control pipes 45 and 55 are open to atmosphere, both the astern pilot valve device 19 and the ahead pilot valve device 21 will operate to open the respective pressure chambers 13 and 12 to atmosphere, under which condition the pressures acting on the opposite sides of the power piston 11 will be the same and said piston will remain in the position to which it previously had been moved.

In the bracket 20 is a timing chamber or reservoir 55a which is connected by a passage 56 to the side outlet of a double check valve 57. One end of this double check valve is subject, through a passage 58, to pressure of fluid in the astern control pipe 45 while the opposite end is subject, through a passage 59, to pressure of fluid in the ahead control pipe 55. Upon supply of fluid under pressure to the astern control pipe 45 the pressure of this fluid acting on the one end of the double check valve 57 will move it to the position shown on the drawings for closing communication between passages 59 and 56 and for opening communication between passages 56 and 58 to thereby connect the timing chamber 55a to the astern control pipe 45 whereby the volume of said timing chamber is added to that of chamber 44 at one side of diaphragm 43 in the astern pilot valve device 19. When fluid under pressure is supplied to the ahead control pipe 55 with the astern control pipe 45 vented, the pressure of this fluid being effective on the opposite end of the double check valve 57 will shift said valve to the position for closing communication between passage 56 and the astern control pipe 45 and for opening said passage to the ahead control pipe 55 for thereby connecting the timing chamber 55a to diaphragm chamber 44 in the ahead pilot valve device 21.

The ahead and astern control pipes 55 and 45, respectively, lead to a fuel cut-off valve device 60 and in these pipes there are disposed flow controlling valve devices 61 and 62, respectively. The flow controlling valve device 61 comprises a check valve 63 arranged to open upon flow of fluid under pressure through the ahead control pipe 55 in the direction of the ahead pilot valve device 21 to allow a relatively rapid rate of flow, but to close upon flow of fluid under pressure through said pipe in the opposite direction. A choke 64 through the check valve 63 connects the opposite sides thereof for restricting the rate of flow of fluid under pressure away from the ahead pilot valve device 21, the flow capacity of this choke having a certain relation to the volume of the timing reservoir 55a which will hereinafter be brought out. The flow controlling valve device 62 in the astern control pipe 45 is identical to the flow controlling valve device 61 and comprises a check valve 63 arranged to permit relatively rapid flow of fluid under pressure through said pipe in the direction of the astern pilot valve device 19 but to close upon flow in the opposite direction, while a choke 64 through said valve is arranged to limit the rate of flow in said opposite direction, the flow capacity of said choke also bearing a certain relation to the volume of the timing reservoir 55, which will be hereinafter brought out.

The fuel cut-off device 60 is associated with the fuel control lever 3 and comprises a casing containing a piston 66 having a rod 67 arranged for engagement with the end of said lever. At one side of piston 66 is a pressure chamber 68 which is open to a control pipe 69 through which fluid under pressure is adapted to be supplied to and released from said chamber. Upon supply of fluid under pressure to chamber 68 the piston 66 will move to a position defined by contact of the piston with a shoulder 70 in the casing and this movement is adapted to act through rod 67 to move the fuel control lever 3 to the position shown in the drawings for cutting off the supply of fuel to the engine. At the opposite side of piston 66 is a non-pressure chamber 71 containing a spring 72 which is under pressure and acting on said piston in opposition to pressure of fluid in chamber 68. Upon release of fluid under pressure from chamber 68 this spring is adapted to move the piston 66 out of contact with shoulder 70 and to a position defined by contact of the piston with a stop 72a for thereby drawing the piston rod 67 in a direction away from the fuel control lever 3 to permit movement of said lever to a position such as indicated by line 4 for supplying fuel to the engine.

At one side of the piston rod 67 is a latch 73 movable in directions toward and away from said rod. The piston rod 67 has a recess 74 arranged to receive the end of latch 73 for holding said rod and fuel control lever 3 in the fuel cut-off position shown in the drawings against movement by spring 72 upon release of fluid under pressure from chamber 68. The latch 73 is operatively connected to a piston 75 having at the latch side a pressure chamber 76 which is open to a control pipe 77 and having at the opposite side a non-pressure chamber 78 containing a spring 79. This spring is under pressure and constantly acting on piston 75 to urge the latch 73 in the direction of the piston rod 67. Upon supply of fluid under pressure to pressure chamber 76 such pressure is adapted to actuate piston 75 to withdraw the latch 73 from the piston rod 67. The latch 73 is slidably mounted in a bore in the casing and is provided with a peripheral recess containing a sealing ring 80 having sliding contact with the wall of said bore to prevent leakage of fluid under pressure from pressure chamber 76 along said latch. A similar sealing ring 81 is provided in piston 75 to prevent leakage past said piston from chamber 76.

Associated with the fuel cut-off valve device 60 are two interlock valve devices 82 and 83 which are structurally identical to the valve device shown in Fig. 7 and hereinbefore described. In the interlock valve device 82 the chamber 25 is connected to the ahead control pipe 55 and chamber 28 is connected to a control pipe 84, while in the interlock valve device 83 chambers 25 and 28 are connected, respectively, to the astern control pipe 45 and to a control pipe 85. The stems 36 of the release valves in the interlock valve devices 82 and 83 are both connected to a lever 87 at one side of a pin 88 upon which said lever is fulcrumed. At the opposite side of pin 88 the lever 87 has an arm 89 the end of which is disposed in a recess in piston rod 67. With the piston 66 and rod 67 in the position shown in the drawings the lever 87 is operated by contact with said rod to seat the release valves 34 and open the supply valves 24 in the interlock valve devices 82 and 83, while upon movement of piston 66 to the position defined by contact of the piston with stop 72a, a spring 89 is adapted to rock said lever to a position to permit opening of said release valves and closing of said supply valves.

A reversing interlock structure 91 is mounted on the casing member 16 which is connected to the pressure head 15 of fluid motor 10 and this structure comprises ahead and astern interlock valve devices 92 and 93, respectively, and a starting interlock valve device 94.

The interlock valve devices 92, 93 and 94 may all be identical in structure to that shown in Fig. 7. In the interlock valve device 92 chamber 28 is connected to the ahead control pipe 84 while chamber 25 is connected to a pipe 95. In the astern interlock valve device 93 chamber 28 is connected to the astern control pipe 85 and chamber 25 is connected to a pipe 96. The pipes 95 and 96 are connected to the opposite ends of a double check valve device 97 the third outlet of which is connected to a pipe 98 leading to one end of another double check valve device 99. The side outlet of the double check valve device 99 is connected to pipe 69 leading to piston chamber 68 in the fuel cut-off valve device 60. In the starting interlock valve device 94 chamber 25 is connected to the starting control pipe 8 while chamber 28 is connected to a control pipe 101.

The interlock valve devices 92, 93 and 94 are spaced from each other with their axes arranged, diagrammatically, in parallel relation and in the same plane. The release valve stems 36 of the interlock valve devices engage plungers 102 which are slidably mounted in suitable bores in the casing provided at one side of a longitudinally movable cam 103, and interposed between the end of each of said plungers and having contact with said side of the cam is a roller or ball 104.

The cam 103 is operatively connected by a pin 105 to one end of a rocker 106 which is mounted to turn on a fulcrum pin 107 provided in the casing member 16. The pin 107 provides for rocking of the rocker 106 and thereby movement of the cam 103 in a direction parallel to the length of the piston rod 14. At each of the opposite sides of fulcrum pin 107 the rocker 106 is provided with an operating finger 108, one of these fingers being provided for contact with a plunger 109 while the other is arranged for engagement by a similar plunger 110. The two plungers 109 and 110 are mounted to slide in suitable parallel bores provided in the casing at one side of the piston rod 14, and the opposite ends of said plungers contact said rod on the side opposite the gear 17.

The piston rod 14 is provided with two recesses 111 and 112 arranged to receive the ends of plungers 109 and 110. These recesses which are arcuate in shape are spaced from each other and connected together by a flat surface 113 formed below the surface of the piston rod at opposite ends of the two recesses.

With piston 11 and rod 14 in the position shown in the drawings it will be noted that plunger 109 is substantially at the bottom of recess 112 while plunger 110 is out of said recess and both of said plungers are engaging the respective fingers 108 of rocker 106 thereby holding said rocker against movement and securing the cam 103 against movement out of the position in which it is shown in the drawings, which is one of three different positions in which the cam may be held, the other two of which will now be described.

Upon movement of piston 11 and rod 14 out of the position shown in the drawings in the direction of the right-hand the pin 110 will be permitted to move into recess 112 as the pin 109 is moved out of said recess and this movement of pin 109 will rock the rocker 106 in a clockwise direction. When the pin 109 is moved out of recess 112 to a position where the surface 113 may move under said pin the rocker 106 will have obtained a neutral position and the cam 103 will have been moved from the position shown in the drawings in the direction of the right-hand to a second one of its positions. The surface 113 is so arranged that upon continued movement of the piston rod 14 in the direction of the right-hand the pin 110 will then move out of recess 112 and onto said surface without changing the position of the rocker 106. The piston 11 and power piston rod 14 will then continue to move relative to and without further operation of rocker 106 and cam 103 until it approaches the pressure head 15 at which time plunger 109 will be engaged by the inclined surface of recess 111 adjacent the piston 11. When this occurs further movement of the piston rod 14 will then act through plunger 109 to rock the rocker 106 further in a clockwise direction and this will be permitted since plunger 110 will be positioned at this time to enter the recess 111. By the time piston 11 attains the position to contact with pressure head 15 the plunger 109 will have been moved out of the recess 111 and the plunger 110 will be substantially at the bottom of said recess, so that the cam 103 will have been moved past its neutral position to the third position.

It will thus be seen that as the piston 11 is moved from the position shown in the drawings to its opposite position the initial movement of the piston will move the cam 103 out of the position shown in the drawings to a neutral position and then said cam will remain in this neutral position until the piston 11 has substantially attained its opposite position at which time the cam 103 will be moved to a position opposite that shown in the drawings. Likewise, upon movement of piston 11 from the position defined by contact with pressure head 15 to the position shown in the drawings, the cam 103 will be shifted from its right-hand position first to its neutral position and then back to the position shown in the drawings, in a manner which will be apparent from the above description.

The cam 103 is provided with a recess 114, adapted to receive roller 104 of the starting interlock valve device 94 when said cam is in its neutral position to permit closing of the supply valve 24 and opening of the release valve 34 in said interlock valve device, while in both extreme positions of said cam the roller 104 of said interlock valve device is adapted to engage the cam outside of the recess 115 for thereby operating said interlock valve device to open said supply valve and thus open communication between pipes 101 and 8.

The cam 103 is also provided with a relatively long recess 115 for receiving rollers 104 of the ahead and astern interlock valve devices 92 and 93. This recess is so arranged that with the cam 103 in the position shown in the drawings, the release valve 34 in the astern interlock valve device 93 will be open so as to open the astern control pipe 85 to atmosphere while in the ahead interlock valve device 92 the supply valve 24 will be open so as to open communication between the ahead control pipe 84 and pipe 95. In the opposite position of cam 103 the condition of the ahead and astern interlock valve devices 92 and 93 will be reversed, that is, so as to open the ahead control pipe 84 to atmosphere past the respective release valve 34 and connect the astern control pipe 85 to pipe 96 by way of the respective supply valve 24. In the neutral position of cam 103 the supply valve 24 in both the ahead and astern interlock valve devices 92 and 93 will be open so as to establish communication between pipes 84 and 95, and pipes 85 and 96, respectively. The reference numeral 120 indicates a directional control valve device which is arranged to control a supply and release of fluid under presure to and from pipe 77 leading to pressure chamber 76 at one side of the latch piston 75 in the fuel cut-off valve device 60. The directional control valve device 120 comprises a casing containing a double check valve 121 controlling communication between pipe 77 and two passages 122 and 123. In one position of the double check valve 121, pipe 77 will be disconnected from passage 123 and connected to passage 122, while in another or upward position of said double check valve said pipe will be connected to passage 123 and disconnected from passage 122. The passages 122 and 123 lead respectively to chamber 128 in an astern valve device 124 and an ahead valve device 125.

The two valve devices 124 and 125 may be identical in construction each comprising a supply valve 126 contained in a chamber 127 and arranged to control communication between said chamber and a chamber 128. A spring 129 in chamber 127 acts on valve 126 to seat same. In the astern valve device 124 chamber 127 is connected to the astern control pipe 85, while in the ahead valve device 125 said chamber is connected to the ahead control pipe 84.

In each of the valve devices 124 and 125 the chamber 128 contains a release valve 130 which contacts a fluted stem projecting from the supply valve 126 and having in turn a fluted stem 131 slidably mounted in a bore in a plunger 132 which is mounted to slide in a bore in the casing. Around plunger 132 in the casing is a recess containing a seal ring 133 having sealing and sliding contact with the peripheral surface of said plunger for preventing leakage of the fluid under pressure from chamber 128 past the plunger. The bore in plunger 132 in which stem 131 of the release valve 130 is slidably mounted opens to a larger bore 134 the outer end of which is closed by a hollow plug 135. The bore 134 is constantly open to atmosphere through one or more ports 136 provided adjacent the closed end of plug 135. A plunger 137 loosely mounted in bore 134 has one end in contact with the release valve stem 131 and is provided at its opposite end with an enlarged head 138 which may be of smaller diameter than said bore to allow flow of fluid past said head upon opening of the release valve 130. Against the head 138 bears one end of a spring 139 the opposite end of which is supported by contact with the inner end of plug 135. This spring is under compression and therefore constantly effective to urge the plunger 132 in a direction away from and thus out of seating engagement with the release valve 130.

The casing of the directional control device is provided midway between the outer ends of the two plugs 135 with a depending lug 140 carrying a fulcrum pin 141 upon which is rockably mounted a lever 142 having two oppositely arranged arms 143 one of which is disposed over the end of each of the plugs 135. In the end of each arm 143 is secured an adjustable actuating screw 144 which engages the respective plug 135. With the parts of the directional control valve device in the positions shown in the drawings the two screws 144 are so adjusted as to permit springs 129 to move the respective supply valves 126 into contact with their seats and to permit movement of plungers 132 by springs 139 out of contact with the respective release valves 130.

Figure 6:
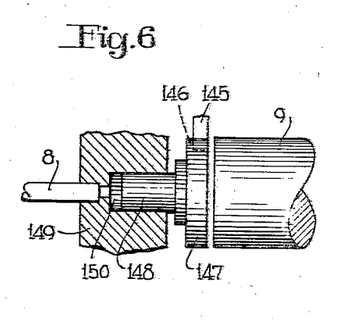
Fig. 6 is a sectional view taken on line 6—6 in Fig. 1—A.

The lever 142 is also provided with a depending operating arm 145 the end of which is loosely accommodated in a slot 146 provided in and open to the peripheral edge of a friction disk 147. The disk 147 is carried on one end of a plunger 148 which is slidably mounted in a bore provided in a casing structure 149 which is adapted to be rigidly supported with respect to the engine so as to support the friction disk in coaxial relation with the end of the engine crank shaft 9, as shown in Fig. 6. The plunger 148 is also effective in the capacity of a piston for moving the friction disk into frictional contact with the end of the engine's crank shaft 9, and to effect such movement its inner end is adapted to be subjected to pressure of fluid in a pressure chamber 150 which is open to the starting control pipe 8.

For controlling operation of the apparatus so far described there is provided an operator's control valve device 155 which may be located immediately adjacent the engine or at any desired remote control station. The operator's control valve device comprises what may be called ahead and astern control valve devices 156 and 157, respectively, a stop valve device 158, a start valve device 159, and a self-lapping speed control valve device 160.

The ahead and astern control valve devices 156 and 157, the stop valve 158 and the start valve device 159 may all be structurally like the valve device shown in Fig. 7, and the fluid pressure supply chamber 28 in all of these valve devices is arranged to be constantly supplied with fluid under pressure from a supply pipe 162. Fluid at a desired reduced pressure, such as 100 lbs. per square inch, is supplied to pipe 162 from the supply pipe 48 by operation of any suitable pressure reducing valve device 163.

The supply valve chamber 25 in the ahead and astern control valve devices 156 and 157 are connected to the ahead and astern control pipes 84 and 85, respectively. Chamber 25 in the stop valve device 158 is connected to a pipe 164 which leads to the end of double check valve 99 opposite to that which pipe 98 is connected. Chamber 25 in the start valve device 159 is connected to pipe 101.

The operator's control valve device further comprises an operating shaft 165 which is supported and suitably journaled at opposite ends in the casing. The shaft 165 is in the form of a tube and mounted within said shaft for longitudinal movement is an operating plunger 166 which extends out beyond the opposite ends of said shaft. Secured to the exterior of the operating shaft 165 is a member 167 on the peripheral surface of which are provided three cams 168, 169 and 170.

The operating shaft 165 has a slot 171 through one side thereof, and registering with this slot is a through slot 172 in the plunger 166 and a slot 173 in the member 167. Extending through these slots is a part 174 of an operator's control lever 175. In the end of the part 174 is a slot through which extends a pin 176 which is secured in the plunger 166. The lever 175 is mounted to turn on a pin 177 secured in an upward extending projection 178 of member 167. By this construction it will be seen that movement of the operator's control lever 175 in a direction lengthwise of plunger 166 will move said plunger relative to the operating shaft 165 in either one direction or in the opposite direction and without turning said shaft, while movement of said lever in the direction circumferentially of the shaft 165 will turn said shaft without longitudinal movement of plunger 166.

Figure 2:
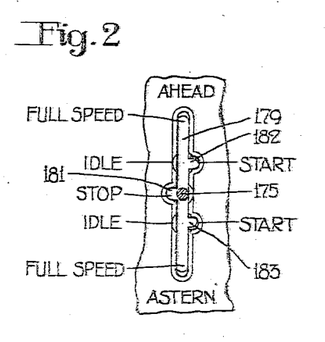
Fig. 2 is a partial plan view of a manual control device shown in vertical section in Fig. 1.
Figure 3:
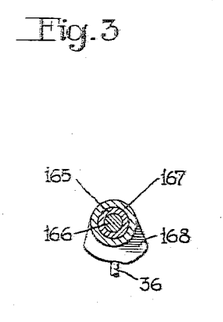
Figs. 3, 4, and 5 are sectional views of said control device taken on lines 3—3, 4—4 and 5—5 in Fig. 1.

The operator's control lever 175 extends through a slot 179 provided in a cover 180 secured to the casing of the device. This slot extends in a direction to permit movement of the operator's control lever to rock the shaft 165 and cam member 167. In the slot 179 the operator's control lever 175 may have a neutral position in which it is shown in Fig. 2 and may be movable from this position in either an "Ahead" direction or in the opposite or an "Astern" direction as indicated by legends in Fig. 2.

Midway between the ends of the slot 179 there is a relatively shallow recess 181 open to one side of said slot and into which the operator's control lever is adapted to be moved out of said slot for moving the plunger 166 longitudinally in one direction in the operating shaft 165. At one side of the recess 181 and opening to the opposite side of said slot 179 is another relatively shallow recess 182 into which the operator's control lever is adapted to be moved for moving the plunger 166 lengthwise in the shaft 165 in the opposite direction. At the opposite side of recess 181 is a third recess 183 for receiving the lever 175 to permit movement of plunger 166 in the same direction as when moved into the recess 182.

The operator's control lever 175 has a "Stop" position in recess 181 which position is adjacent its neutral position, above mentioned, in slot 179. At the "Ahead" side of neutral position the operator's control lever has an engine "Idle" position in slot 179 opposite recess 182 and an engine "Start" position in said recess. Movement of the lever beyond the "Idle" position in the direction of the legend "Ahead" is adapted to accelerate the engine in a manner to be later described in accordance with the position of said lever between "Idle" position and the extreme end of slot 179, full speed of the engine being obtained at said end of slot 179 indicated by the legend "Full speed." Corresponding "Idle," "Start" and "Full speed" positions of the operator's control lever are provided at the opposite or "Astern" side of neutral position, said "Start" position being provided in recess 183. The space between recess 183 and the "Astern" end of slot 179 constitutes the speed control zone for operation of the engine in the "Astern" direction.

The ahead and astern valve devices 156 and 157 are arranged with the axes of the release valve stems 36 at right angles to the axes of cams 168 and 170 and in contact respectively with the peripheral surfaces thereof. The cam 168 is so designed as to actuate the astern valve device 157 to connect the fluid pressure supply pipe 162 to the astern control pipe 85 when the operator's control lever 175 is in any position between and including the "Idle" and "Full speed" positions at the "Astern" side of neutral position and to permit operation of said valve device to open the control pipe 85 to atmosphere in all other positions of said lever. The cam 170 is identical to cam 168 but reversely arranged so as to thereby actuate the ahead valve device 156 to open the ahead control pipe 84 to the fluid pressure supply pipe 162 in and between the "Idle" and "Full speed" positions at the "Ahead" side of neutral position of lever 175 and to permit operation of said valve device to open the ahead control pipe 84 to atmosphere in all other positions of said lever.

The self-lapping speed control device 169 is provided to vary pressure of fluid in a speed control pipe 164a to govern means, not shown in the drawings and which form no part of the present invention, for varying the speed or power output of the engine in proportion to the pressure of such fluid. By way of illustration the device 160 may be substantially like that fully disclosed in the patent to Harry C. May, No. 2,381,222, issued August 7, 1945, and assigned to the assignee of the present application and therefore comprises a control plunger 185 and means (not shown) governed by displacement of said plunger from a normal position, in which it is shown in the drawings, into the device to provide fluid in pipe 164a at a pressure corresponding to the degree of such displacement. With plunger 185 in its normal or outermost position a minimum pressure of fluid such as atmospheric will be provided in pipe 164a which is adapted to cause operation of the engine at idling speed.

Figure 4:
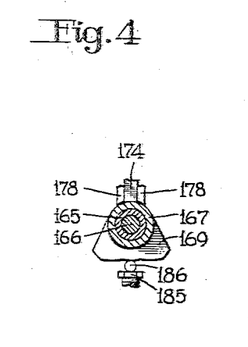
Figure 5:
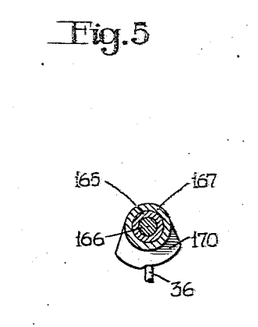

The cam 169 is provided for controlling the displacement of plunger 185 and is operatively connected thereto through the medium of one end of the arm 186 an opposite end of which is fulcrumed to rock on a pin 187. The cam 169 is so designed (Fig. 4) as to allow the plunger 185 to remain in its normal position shown in the drawings with the operator's control lever 175 in any position between and including the two "Idle" positions, and is operable upon movement of the lever beyond either of the "Idle" positions to depress the plunger 185 in proportion to the extent of such movement. The maximum displacement of plunger 185 into the device and, therefore, the maximum pressure of fluid will be obtained in the speed control pipe 164a upon movement of the operator's control lever to either of the "Full speed" positions.

One end of plunger 166 is operatively connected to one end of a lever 190. The opposite end of this lever is fulcrumed on a pin 191 secured in the casing while an intermediate portion of said lever contacts the release valve stem 36 of the starting valve device 159. These parts are so arranged and designed that movement of plunger 166 in response to movement of the operator's control lever 175 to either "Start" position, i. e., into either of the starting recesses 182 or 183, will operate the start valve device 159 to supply fluid under pressure to the start control pipe 101, while with said lever out of the recesses 182 or 183 said valve device will operate to release fluid under pressure from pipe 101.

The opposite end of plunger 166 is operatively connected to one end of a lever 193 the opposite end of which is fulcrumed on a pin 194 secured in the casing. An intermediate portion of lever 193 contacts the release valve stem 36 of the stop valve device 158 and the parts are so arranged that upon movement of lever 175 into recess 181 the longitudinal movement of plunger 166 will operate the stop valve device 158 to supply fluid under pressure from the supply pipe 162 to pipe 164. With the operator's control lever 175 out of recess 181 the plunger 166 will be positioned to effect operation of the stop valve device 158 to open pipe 164 to atmosphere.

*Operation*

In operation, let it be initially assumed that the operator's control lever 175 is in neutral position as shown in Fig. 2, in which position the ahead and astern valve devices 156 and 157 will be in the position opening the ahead and astern pipes 84 and 85, respectively, to atmosphere, the stop valve device 158 will be in the position opening pipe 164 to atmosphere, the start valve device 159 will be in the position opening pipe 101 to atmosphere, and the plunger 185 of the speed control valve device 160 will be in the normal position shown in the drawings.

Let it further be assumed that the engine is stopped from previous operation in an astern direction, under which condition the power piston 11 will be occupying the position shown in the drawings for positioning the reversing shaft 1 for operation of the engine in the reverse direction. With the power piston 11 thus positioned the parts of the reversing interlock structure 91 will occupy the positions in which they are shown in the drawings in which the starting interlock valve device 94 will be in the position opening pipe 8 to pipe 101 which is open to atmosphere through the start valve device 159. The starting air valve device 5 will therefore be conditioned to close communication between pipe 7 and pipe 6 which latter pipe may be assumed to be supplied with starting air.

With pipe 8 open to the atmosphere fluid will be released from chamber 150 in the directional control valve device 120 to permit disengagement of disk 147 from the crank shaft 9, whereupon the parts of the directional control valve device will assume the positions in which they are shown in Fig. 1—A due to the centralizing action of springs 129 on the supply valves 126 and of springs 139 on plungers 132. With the release valves 130 thus opened, the latch piston chamber 76 in the fuel cut-off valve device 60 will be open to atmosphere through pipe 77, past the double check valve 121 and either one or the other of said valves depending upon the position of the double check valve. In the fuel cut-off valve device 60 spring 79 will therefore be effective to urge the latch 73 into contact with the piston rod 67.

Let it further be assumed that piston 66 and rod 67 in the fuel cut-off device 60 are positioned as shown in the drawings holding the fuel control arm 3 in the position for cutting off the supply of fuel to the engine and in which position latch 73 will interengage with said rod within recess 74 to maintain the fuel cut off with fluid released from piston chamber 68 by way of pipe 69 through the double check valve device 99, pipe 164 and the stop valve device 158 in the operator's control device. The manner in which piston 66 is operated to cut off the supply of fuel to the engine and in which latch 73 is rendered effective as just described will become apparent from description to follow.

With rod 67 in the fuel cut-off device in the position just described lever 87 will be operated to effect operation of the interlock valve devices 82 and 83 to open pipes 45 and 55 to pipe 85 and 84, respectively, which latter pipes are open to atmosphere through valve devices 157 and 156, respectively, in the operator's control valve device, as above described. With pipes 45 and 55 open to the atmosphere, the parts of the astern pilot valve device 19 and of the ahead pilot valve device 21 associated with the fluid motor 10 will assume the positions in which they are shown in the drawings to open chambers 13 and 12, respectively, at opposite sides of the power piston 11 to atmosphere.

Let it further be assumed that pipe 48 is supplied with fluid at the required pressure from any suitable source. Fluid thus supplied to pipe 48 will flow to chambers 28 in the astern pilot valve device 19 and in the ahead pilot valve device 21 associated with the fluid motor 10, and also to the reducing valve device 163 which will then operate to supply fluid at the desired reduced pressure to pipe 162. Fluid supplied to pipe 162 will then flow to chamber 28 in the ahead and astern valve devices 156 and 157, respectively, in the stop valve device 158 and in the start valve device 159 in the operator's control valve device.

If the operator now desires to start the engine in the direction of previous operation, that is, in the astern direction, he will move lever 175 from neutral position in the "Astern" direction to "Idle" position adjacent recess 183 and then if desired directly into said recess. This movement of lever 175 to the "Astern" "Idle" position will effect operation of the astern valve device 157 to supply fluid under pressure to the astern control pipe 85, while movement of the lever into recess 183 will effect operation of the start valve device 159 to supply fluid under pressure to pipe 101 leading to the reversing interlock structure 91.

Fluid under pressure thus supplied to the astern control pipe 85 will flow to the supply valve chamber 127 of the astern valve device 124 in the directional control valve device 120 but the respective supply valve 126 will be closed at this time. Fluid supplied to the astern control pipe 85 will also flow to the astern interlock valve device 93 in the reversing interlock structure 91 but the supply valve 24 of this valve device is also closed at this time. Fluid under pressure supplied to the astern control pipe 85 will also flow to the interlock valve device 83 in the fuel cut-off valve device 60 and since at this time the valve device 83 is conditioned to open communication between pipes 85 and 45 fluid under pressure will flow to pipe 45 and thence past check valve 63 therein to the lower end of the double check valve 57 in bracket 20 depending from the fluid motor 10, and also to diaphragm chamber 44 in the astern pilot valve device 19 carried by said bracket. The pressure of fluid thus provided on the lower end of the double check valve 57 will shift same to the position shown in the drawings, in case said check valve is not already thus positioned, whereupon fluid will also flow from pipe 45 into the timing chamber 55a.

When the pressure of fluid in diaphragm chamber 44 of the astern valve device 19 and in the connected timing chamber 55a then becomes sufficient to overcome the opposing pressure of spring 46 on diaphragm 43 said diaphragm will be deflected to its lower position to operate the supply and release valve structure 23 to supply fluid under pressure from passage 50 to passage 51 leading to pressure chamber 13 at the right hand side of the power piston 11. With piston 11 in the astern position, as shown in the drawings, the pressure of fluid thus provided in pressure chamber 13 will be without effect, it being noted that the reversing shaft 1 is already in the position of previous operation of the engine to provide for operation in the same or astern direction.

At the same time that fluid under pressure flows from the control pipe 85 to the various parts above described, fluid under pressure supplied by the starting air valve device 159 to pipe 101 will also flow through the starting interlock valve device 94 of the reversing interlock structure 91 to pipe 8 and thence to the starting air valve device 5. The pressure of fluid thus provided through pipe 8 to the starting air valve device 5 will then effect operation thereof to supply fluid under pressure from pipe 6 to pipe 7 leading to the starting mechanism of the engine. The engine will then start to turn under the pressure of fluid provided through pipe 7 and in the direction determined by the position of the reversing shaft 1.

When fluid under pressure is supplied to pipe 8 to effect starting of the engine as just mentioned fluid will also flow from said pipe to chamber 150 of the directional control device 120 and therein act on plunger 148 to move disk 147 into frictional contact with the end of the crank shaft 9. Then as soon as the engine and crank shaft 9 start to turn under pressure of starting air supplied through pipe 7 and in the direction determined by the reversing shaft 1, such turning will cause rocking of the friction disk 147 in a corresponding or counterclockwise or "astern" direction, as viewed in Fig. 1—A, and this rocking of the disk 147 will act to turn lever 142 in a clockwise direction about its connection with pin 141.

In the astern valve device 124, this rocking of lever 142 in a clockwise direction will move plunger 132 into seating contact with the release valve 130 and then act through said valve to unseat the respective supply valve 126, whereupon fluid under pressure from the astern control pipe 85 will flow past said supply valve to passage 122 and thence to the upper end of the double check valve 121. With the double check valve 121 already in the position shown in the drawings, fluid under pressure supplied to passage 122 will flow past said check valve to pipe 77 and thence to pressure chamber 76 at one side of the latch piston 75, and when this pressure becomes sufficient to overcome the opposing force of spring 79 said piston will be moved in a direction away from rod 67 for thereby withdrawing the latch 73 from the recess 74. At this time piston chamber 68 is open to atmosphere as above described, so that as soon as latch 73 is withdrawn from recess 74 spring 72 will move piston 66 and thereby rod 67 to the position defined by contact between said piston and stop 72a, and this will permit movement of the fuel control lever 3 from its fuel cut-off position to the position indicated by line 4 for supplying fuel to the engine. With the engine already turning under pressure of the starting air provided through pipe 7, this supply of fuel to the engine will allow the engine to fire and to then run on fuel.

After the engine is thus running on fuel the operator will move lever 175 out of the starting recess 183 back into slot 179 and if the lever is allowed to remain in the adjacent "Idle" position the engine will continue to turn on fuel at a minimum or idling speed. This movement of the operator's control lever out of recess 183 will effect operation of the starting valve device 159 to release fluid under pressure from pipe 101 and thereby from the connected pipe 8 so that the starting valve device 5 will then operate to cut-off the supply of starting air to pipe 7 and thus to the cylinders of the engine. This release of fluid under pressure from pipe 8 will also result in release of fluid under pressure from piston chamber 150 in the directional control valve device 120, whereupon the friction disk 147 may free itself from the revolving crank shaft 9. The parts of the directional control valve device 120 will then return to the positions in which they are shown in the drawings under the action of springs 129 and 139, as above described. With the directional control valve device thus returned to its normal condition fluid under pressure will be released from chamber 76 in the fuel cut-off valve device 60 by way of pipe 77, past the double check valve 121 and thence past the release valve 130 in the astern valve device 124 of the directional control valve device. Upon this release of fluid under pressure from chamber 76 in the fuel cut off valve device spring 79 will move latch 73 against the piston rod 67 so as to become effective to hold said rod in the position for cutting off the supply of fuel to the engine upon subsequent movement of said rod and of piston 66 to such position.

With the engine now running on fuel, the operator may accelerate the engine to any desired degree by moving the lever from "Idle" position adjacent recess 183 in the direction of the legend "Astern" (Fig. 2) for thereby effecting operation of the self-lapping valve device 160 to provide fluid at the proper pressure in the speed control pipe 164a.

When piston 66 and rod 67 in the fuel cut-off valve device 60 are returned to the position defined by contact between said piston and stop 72a as above described, the lever 87 is operated to permit operation of the interlock valve devices 82 and 83 to close communication between pipes 84 and 85, and 55 and 45, respectively, and to open the latter two pipes to atmosphere. The opening of pipe 55 to atmosphere at this time is immaterial since it is void of fluid under pressure as will be apparent from the above description, but the opening of pipe 45 to atmosphere will permit release of fluid under pressure from the timing chamber 55a and diaphragm chamber 44 in the astern valve device 19 at a rate determined by the flow capacity of choke 64 in the check valve device 62 with respect to the volume of said chambers. This rate is such as to maintain the astern valve device 19 in the condition supplying fluid under pressure to pressure chamber 13 for a certain interval of time, such as thirty seconds, after which the pressure in said chambers will become sufficiently reduced for spring 46 in the astern valve device 19 to move diaphragm 43 to its upper position and permit operation of the valve structure 23 to close communication between the fluid pressure supply passage 50 and pressure chamber 13 and to open said chamber to atmosphere for releasing actuating fluid pressure from said chamber.

One reason for this thirty second delay will be hereinafter described, but a second reason is as follows. Some motors such as the fluid motor 10 may be provided with what may be termed a hydraulic dampener which comprises a piston arranged to be subjected to oil under pressure opposing movement of the piston 11 out of the position to which it is moved by fluid pressure, such as the position in which it is shown in the drawings, upon release of actuating fluid, as from pressure chamber 13 in the operation under consideration. Oil pressure for actuating this locking piston is, under certain conditions, obtained from the lubricating system of the engine and to obtain such pressure it is therefore necessary that the engine operate for a certain period of time, and this period of time is less than the delay in operation of the astern valve device 19 to release fluid from pressure chamber 13. Thus the choke 64 and timing chamber 55 are effective to maintain the astern valve device 19 in the condition maintaining pressure of fluid effective in pressure chamber 13 until after the hydraulic dampener becomes effective, following which the fluid pressure will be released from pressure chamber 13, as above described, and the power piston 11 and reversing shaft 1 will then remain in the selected position.

If the operator now desires to stop the engine he will move the control lever 175 back to neutral position (Fig. 2) to permit operation of the astern valve device 157 to open the astern control pipe 85 to atmosphere. The operator will then shift the lever 175 into recess 181 for operating the stop valve device 158 to supply fluid under pressure to pipe 164. Fluid thus supplied to pipe 164 will flow through the double check valve device 99 to pipe 69 and thence to piston chamber 68 in the fuel cut-off valve device 60. The pressure of fluid thus obtained in chamber 68 and acting on piston 66 will then move said piston and rod 68 to the position defined by contact between said piston and shoulder 70 and this movement will move the fuel control lever 3 from the fuel supply position indicated by line 4 to the fuel cut-off position shown in the drawings, for thereby cutting off the supply of fuel to the engine, whereupon the engine will stop.

When rod 67 in the fuel cut-off valve device attains the position shown in the drawings the latch 73 will be moved by spring 79 into the recess 74 in said rod. The operator may then move the control lever 175 out of the recess 181 back into slot 179 to effect operation of the stop valve device 158 to release fluid under pressure from chamber 68 in the fuel cut-off valve device 60, since the latch 73 will hold rod 67 in the position for maintaining the supply of fuel to the engine cut off.

If the operator now desires to start and run the engine in the ahead direction he will move lever 175 from its neutral position in the direction of the legend "Ahead" to the "Idle" position and then if desired directly into the recess 182. This movement of lever 175 to "Ahead" "Idle" position will operate the ahead valve device 156 to supply fluid under pressure to the ahead control pipe 84 and movement into recess 182 will operate the start valve device 159 to supply fluid under pressure to pipe 101 and with the reversing interlock structure 91 in the position in which it is shown in the drawings, fluid under pressure supplied to pipe 101 will flow to pipe 8 and cause operation of the air starting valve device 5 to supply air to the starting pipe 7 and thence to the engine which will act to cause turning of the engine in the direction of previous operation.

At the same time as starting air is supplied through pipe 7 to the engine as just described, fluid under pressure will also flow from the ahead control pipe 84 through the ahead interlock valve device 92 in the reversing interlock structure 91 to pipe 95 and thence through the double check valve 97, pipe 98, double check valve device 99 and pipe 69 to piston chamber 68 in the fuel cut-off valve device 60 to insure that piston 66 and rod 67 will maintain the fuel cut-off lever 3 in the fuel cut-off position, and to also effect operation of the lever 87 to actuate the interlock valve devices 82 and 83 to their communication opening positions shown in the drawings, in case they are not already in such position. Fluid supplied to the ahead control pipe 84 will then flow through the interlock valve device 82 to pipe 55 and past check valve 63 therein to one end of the double check valve 57 in the bracket 20 depending from the fluid motor 10 and also to diaphragm chamber 44 in the ahead pilot valve device 21. With the operator's control lever 175 in the "Ahead" "Idle" position or in recess 183 the astern control pipe 85 will be open to atmosphere through the astern valve device 157, and as a result, the lower end of the double check valve 57 and diaphragm chamber 44 in the astern pilot valve device 19 will be open to atmosphere and said pilot valve device will be conditioned to open the power piston chamber 13 to atmosphere. The pressure of fluid provided through the ahead control pipe 55 to the upper end of the double check valve 57 will therefore shift said valve to its lower position and fluid under pressure will then be supplied to the timing chamber 55a at the same time as to chamber 44 in the ahead valve device 21. When a sufficient degree of pressure is thus obtained in the timing chamber 55a and chamber 44 in the ahead pilot valve device 21 to overcome the opposing pressure of spring 46 on the respective diaphragm 43, said valve device will operate to supply fluid under pressure to power piston chamber 12. With chamber 13 open to atmosphere, the pressure of fluid thus provided in chamber 12 will then move piston 11 in the direction of the right hand.

The initial portion of this movement of piston 11 will actuate cam 103 in the reversing interlock structure 91 to effect operation of the starting interlock valve device 94 to cut off the supply of fluid under pressure to pipe 8 and to open said pipe to atmosphere whereupon the supply of starting air to pipe 7 will be cut off and said pipe will also be open to atmosphere. Thus while starting air may be supplied to the engine at the time of initiating the reversing operation the supply is immediately cut off and then maintained cut off until after the reversing operation is completed as will be later brought out.

The initial movement of cam 103 in response to movement of piston 11 in the direction of the right hand will also effect operation of the ahead interlock valve device 92 to close communication between the ahead control pipe 84 and pipe 95 and open the latter to atmosphere for thereby releasing fluid under pressure from piston chamber 68 in the fuel cut-off valve device 60. Due to the action of latch 73 the piston 66 and rod 67 will, however, remain in the condition holding the fuel supply arm 3 in the fuel cut-off position, as shown in the drawings. The initial movement of cam 103 will also effect operation of the astern valve device 93 to establish communication between pipe 96 and the astern control pipe 85, as required for subsequent reversal of the engine, but this is immaterial to the present operation.

As the piston 11 is moved in the direction of pressure head 15 it acts through gear 17 to turn the reversing shaft 1 from its astern position in the direction of its ahead position for conditioning the valve gear or timing of the engine to provide for operation in the ahead direction, and as said piston approaches said pressure head the cam 103 will act to effect operation of the starting interlock valve device 94 to reopen communication between the starting control pipe 101 and pipe 8 so as to supply fluid under pressure to the starting air valve device 5 for effecting operation thereof to supply starting air to the pipe 7. It will be noted that this supply of starting air to pipe 7 will not be obtained until the piston 11 is substantially in contact with the pressure head 15 and the reversing shaft 10 substantially obtains its ahead position. Thus after the valve timing or valve gear of the engine has been conditioned to provide for operation of the engine in the ahead direction starting air will be supplied through pipe 7 to the engine to cause same to start turning in said direction.

Pressure of fluid provided in pipe 8 for effecting operation of the starting air valve 5 to supply starting air to the engine, is also effective in pressure chamber 150 in the directional interlock valve device 120, to actuate piston 148 to move disk 147 into frictional contact with the end of crank shaft 9. As soon as the engine starts turning under the pressure of air supplied to pipe 7, the friction disk 147 will therefore turn in the same direction as the crank shaft 9 is turning and with the crank shaft 9 turning in the ahead direction said disk will actuate lever 142 in a counterclockwise direction. This operation of lever 142 will effect operation of the ahead valve device 125 in the directional control valve device to open communication between the ahead control pipe 84 and passage 123 whereupon fluid under pressure from said pipe will flow through said passage to the double check valve 121 and shift said valve to its upper position. With the double check valve in its upper position fluid under pressure will then flow from passage 123 to pipe 77 and thence to the latch piston chamber 76 in the fuel cut-off valve device 60. The pressure of fluid in chamber 76 will then move piston 75 against spring 79 and withdraw latch 73 from recess 74 whereupon, with piston chamber 68 vented by way of the ahead interlock valve device 92 in the reversing interlock structure 91 as above described, spring 72 will move piston 66 and rod 67 to the position defined by contact between said piston and stop 72a. This operation of rod 67 will then permit movement of the fuel control lever 3 from its fuel cut-off position shown in the drawings to the position indicated by line 4 for supplying fuel to the engine, so that said engine may fire and run on fuel.

After the engine is running on fuel the operator will move the control lever 175 out of the recess 182 back into the slot 179 and this movement will effect operation of the starting valve device 159 to release fluid under pressure from pipe 101, and thereby from pipe 8. This release of fluid from pipe 8 will effect operation of the starting air valve device 5 to cut off the supply of starting air to pipe 7 and open said pipe to atmosphere. The release of fluid under pressure from pipe 8 and thus from pressure chamber 150 in the directional control valve device 120 will also relieve the friction disk 147 of force urging it against the end of the crank shaft 9, whereupon the parts of the directional control valve device 120 will return to the position in which they are shown in the drawings, in which position fluid under pressure will be released from pressure chamber 76 in the fuel cut-off valve device by way of pipe 77 past the double check valve 121 in the directional control valve device 120 and thence past the release valve 130 in the ahead valve device 125. In the fuel cut-off valve device, spring 79 will then urge latch 73 against the rod 67 so that it may be effective to latch said rod in its fuel cut-off position upon subsequent supply of fluid under pressure to piston chamber 68.

When the fuel cut-off piston 66 moves in response to operation of the directional control valve device 120, to supply fuel to the engine, such movement actuates lever 87 to effect operation of the interlock valve devices 82 and 83 to close communication between the respective pipes and to open pipes 55 and 45 to the atmosphere. Upon opening of pipe 55 to atmosphere fluid under pressure will be released from timing chamber 55a in bracket 20 and from diaphragm chamber 44 in the ahead pilot valve device 21 at a rate determined by the flow capacity of choke 64 in check valve device 61. This rate is such as to maintain sufficient pressure in chamber 44 of the ahead pilot valve device 21 to maintain the parts of said valve device in the position for supplying fluid under pressure to pressure chamber 12 for a certain interval of time after operation of the fuel cut-off valve device 60 to supply fuel to the engine. One reason for this delayed or retarded release of fluid under pressure from timing chamber 55a and diaphragm chamber 44 has been hereinbefore described, while another reason is to maintain pressure on the power piston 11 for a sufficient period of time to insure complete movement thereof into engagement with pressure head 15, during the operation just described.

When the pressure of fluid in timing chamber 55a and in diaphragm chamber 44 of the ahead valve device 21 becomes sufficiently reduced, as at the end of the delay period, above mentioned, the spring 46 in said device will return the diaphragm 43 to the position in which it is shown in the drawings, whereupon the valve structure 52 controlled by said diaphragm will act to cut off the supply of fluid under pressure to pressure chamber 12 and to open said chamber to atmosphere for thereby relieving the piston 11 of pressure of fluid.

After the engine has started in the ahead direction and is running on fuel as above described, the operator may then accelerate the engine to any desired degree by moving the control lever 175 from the "Idle" position adjacent the start recess 182 in the direction of the legend "Ahead" as will be apparent.

If the operator now desires to stop the engine he will merely move the control lever 175 back to its neutral position and into the recess 181 for thereby operating the stop valve device 158 to supply air to pipe 164 and thence through the double check valve device 99 and pipe 69 to pressure chamber 68 in the fuel cut-off valve device 60. Piston 66 will thereby be moved to the position in contact with shoulder 70 for moving the fuel control arm 3 to its fuel cut-off position in which it will then be maintained by the latch 73. With the supply of fuel to the engine thus cut-off the engine will stop.

Now let it be assumed that the engine is operating in the ahead direction with the control lever 175 positioned at the "Ahead" side of recess 182 and that the operator desires to reverse the engine. To accomplish this he will move the control lever directly to "Idle" position at the "Astern" side of neutral position and then into the start slot 183 and thus effect operation of the ahead valve device 156 to open the ahead control pipe 84 to atmosphere and at the same time effect operation of the astern valve device 157 to supply fluid under pressure to the astern control pipe 85, and to also operate the starting valve device 159 to supply air to the starting air pipe 101.

With the reversing piston 11 in its ahead position in contact with the pressure head 15 and with the reversing interlock structure 91 correspondingly positioned fluid under pressure supplied to pipe 101 will then flow through the starting interlock valve device 94 to pipe 8 and thus temporarily cause operation of the starting air valve device 5 to supply starting air to the starting air pipe 7, as above described.

With piston 11 in contact with the pressure head 15, the astern interlock valve device 93 opens communication between pipe 85 and pipe 96 so that fluid from pipe 85 will flow to pipe 96 and thence through double check valve 97, pipe 98, double check valve 99 and pipe 67 to piston chamber 68 in the fuel cut-off valve device 60 to thereby effect operation of piston 60 and rod 67 to move the fuel control arm 3 to cut off the supply of fuel to the engine to allow the engine to stop. Pressure chamber 76 below the latch piston 75 is at this time open to atmosphere through the directional control valve device 120, so that when the piston rod 67 is moved to the position for cutting off the supply of fuel to the engine, the latch 73 will become effective to hold said rod in said position upon subsequent release of fluid under pressure from pressure chamber 67 by operation of the astern interlock valve device 93, as will be later brought out.

Fluid under pressure supplied to the astern control pipe 85 as above described will also flow to the fuel cut-off valve device 60, and with the fuel to the engine cut off the interlock valve device 83 will be operated to open pipe 85 to pipe 45 so that fluid under pressure will flow past the check valve 63 in the check valve device 62 to the double check valve 57 in bracket 20 and to diaphragm chamber 44 in the astern pilot valve device 19. The astern pilot valve device 19 will then operate to supply fluid under pressure to chamber 13 at the right hand face of the power motor piston 11, chamber 12 at the left-hand face of piston 11 being at this time open to atmosphere through the ahead pilot valve device 21 since the ahead control pipes 55 and 84 are both open to atmosphere. The pressure of fluid thus provided in chamber 13 will then move the piston 11 in the direction of the left-hand for thereby operating the gear wheel 17 to turn the reversing shaft 1 for reversing the valve gear or valve timing of the engine to provide for operation of the engine in the reverse or astern direction.

The initial movement of piston 11 away from the pressure head 15 will effect operation of the starting interlock valve device 94 to close communication between pipes 101 and 8 and to release fluid under pressure from pipe 8 for thereby effecting operation of the starting air valve device 5 to cut off the supply of starting air to the engine during the process of reversing the engine valve gear. The starting interlock valve device 94 will then maintain communication closed between pipes 101 and 8 until the piston 11 substantially attains the position in which it is shown in the drawings, at which time said interlock valve device will operate to again open communication between said pipes. Thus, after the piston 11 is operated to substantially reverse the valve timing or gear of the engine, fluid under pressure will again be supplied to the starting air valve device 5 to cause operation of said device to supply pipe 7 to effect starting of said engine to turn in the new direction determined by the reversing shaft 1.

Fluid under pressure supplied to pipe 8 for thus effecting operation of the starting air valve device 5 will also flow to pressure chamber 150 in the directional control valve device 120 and therein act to move the friction disk 147 into contact with the end of crank shaft 9. Upon the starting of the engine by air supplied through pipe 7, the rotation of crank shaft 9 will then effect rotation of the friction disk 147 and consequently operation of the directional control valve device 120 to supply fluid under pressure from the astern control pipe 85 to pipe 77 and thence to the latch piston chamber 76, whereupon the latch piston 75 will be moved against the opposing pressure of spring 79 to withdraw the latch 73 from recess 74 in piston rod 67.

When the power piston 11 substantially attains the position in which it is shown in the drawings, the astern interlock valve device 93 will operate to open pipe 96 to atmosphere so as to thereby release fluid under pressure from piston chamber 68 in the fuel cut-off valve device 60. Thus upon release of the latch 73 from the piston rod 67, spring 72 will return piston 66 to the position defined by contact of the piston with stop 72a, to thereby permit movement of the fuel control lever 3 from the fuel cut-off position to the fuel supply position indicated by line 4. Fuel will then be supplied to the engine so that the engine will fire and operate on fuel.

After the engine is thus operating on fuel the operator will return lever 175 out of the recess 183 into the slot 179 for effecting operation of the starting air valve device 159 to cut off the supply of fluid under pressure to pipe 101 and thus to pipe 8. The starting air valve device 5 will then operate to cut off the supply of starting air to pipe 7 and thus to the engine, whereupon the parts of the directional control valve device 120 will return to the positions in which they are shown in the drawings for releasing fluid under pressure from the latch piston chamber 76. Spring 79 will then move the latch 73 into contact with the rod 67 for operation upon subsequent movement of piston 66 to cut off the supply of fuel to the engine.

When piston 11 is moved from its ahead position to the astern position shown in the drawings, the ahead interlock valve device 92 is operated to open communication between the ahead control pipe 84 and pipe 95, so that when the operator desires to reverse the direction of operation of the engine from astern to ahead, fluid supplied to the ahead control pipe 84 will flow to chamber 68 in the fuel cut-off valve device 60 for actuating said device to cut off the supply of fuel to the engine.

When the fuel cut-off valve device 60 operates to allow fuel to be supplied to the engine as just described the lever 87 is operated to permit operation of the interlock valve devices 82 and 83 to open pipes 55 and 45, respectively, to atmospere. This operation is immaterial at this time insofar as pipe 45 is concerned since said pipe is already at atmospheric pressure, however, this operation of the astern valve device 83 acts to release fluid under pressure from pipe 45 and thus from timing chamber 55a and diaphragm chamber 44 of the astern pilot valve device 19 associated with the fluid motor 10 at a rate determined by the choke 64 to provide the delay period herebefore mentioned. When the pressure of fluid in the astern pilot valve device 19 becomes sufficiently reduced said device will operate to release fluid under pressure from piston chamber 13, so that the power piston 11 is relieved of pressure of fluid.

It will now be noted that in reversing the direction of operation of the engine from ahead to astern in response to manual movement of the operator's control lever 175 into recess 183, the control apparatus will operate automatically to first cut off the supply of fuel to the engine and at substantially the same time will initiate reversing of the engine's valve gear or timing. A slight flow of starting air to the engine will occur at the initiation of the reversing operation, but this is promptly terminated and maintained cut off until after the shifting or reversing of the engine valve gear or timing has been substantially completed, following which starting air will be again supplied to the engine, to start it turning in the new direction. After the engine then starts to turn in the new direction fuel will be automatically supplied to the engine so that it may fire and run on fuel. The operator will then actuate lever 175 to cut off the supply of starting air to the engine following which he may vary the speed of operation of said engine by further movement of said lever.

In the operation just described, reversal of the engine's valve gear or timing may be completed with the engine still turning in the direction of previous operation. Thus fluid under pressure will be supplied to pipe 8 resulting in supply of starting air through pipe 7 to the engine before the engine has stopped, but this is desirable since the pressure of such starting air on the engine pistons will act as a brake for promptly bringing the engine to a stop and then be immediately effective to start the engine turning in the new, or astern direction in the present instance, as determined by the reversed valve timing.

The supply of fluid under pressure to pipe 8 immediately upon completing reversal of the engine's valve timing and prior to the engine becoming stopped will also cause operation of the directional control device 120 according to the previous or ahead direction of operation of the engine, or in other words, the ahead valve device 125 will be operated to open the ahead control pipe 84 to pipe 77. This last operation is without effect however since pipe 84 is open to atmosphere through the operator's control valve device at this time. However, after the engine is stopped and then starts turning in the new or astern direction under the pressure of starting air, then the directional control device 120 will operate to actuate the astern valve device 124 to open communication between the astern control pipe 85 and pipe 77 to cause fuel to be supplied to the engine so that the engine may then fire and run on fuel.

In the operation just under consideration it is desired to emphasize that while starting air cannot be supplied to the engine during reversal of the engine's timing, it will be supplied immediately at completion of said reversal, and further, the directional control valve device will operate immediately upon reversal of the engine's timing but it will prevent supply of fuel to the engine until after the engine has been stopped and then started in the new and intended direction of operation.

If the engine is operating in the astern direction and the operator desires to reverse the engine, he need only move the control lever into the starting recess 182, and the apparatus will then operate to effect such reversal in a manner which will be apparent from the above description of reversal from ahead to astern.

As above described, the timing chamber 55a in conjunction with choke 64 in either of the flow controlling valve devices 61 or 62 functions to delay release of fluid under pressure from chamber 12 or 13 at one side or the opposite side of the power piston for a certain interval of time (thirty seconds) after fuel is supplied to the engine to cause it to run. Now if the operator had initiated starting of the engine in a certain direction and then prior to the release of fluid under pressure from the timing chamber 55a and pressure chamber 12 or 13 he suddenly desired to reverse the direction of operation of the engine, it would be undesirable for him to have to wait until the expiration of the delay period to relieve the power piston of pressure of fluid previously supplied to obtain operation of said piston to condition the engine for operation in the newly selected direction. According to the invention, the single timing chamber 55a and double check valve 57 act under a condition such as just set forth to substantially eliminate the thirty second delay period and to thereby accelerate the obtaining of the reversal of the engine, as will now be described.

Let it be assumed that the operator has actuated the control lever 175 to effect operation of the control apparatus to start the engine in the astern direction, and that, before the fluid under pressure is released from the timing chamber 55a and pressure chamber 13 at one side of the power piston 11, he suddenly desires operation of the engine in the ahead direction. To accomplish this he will move lever 175 into the start slot 182 and this operation will release fluid under pressure from the astern control pipe 85 and at the same time will supply fluid under pressure to the ahead control pipe 84. The fuel supply to the engine will then be cut off by fluid under pressure from pipe 84 supplied through the ahead interlock valve device 91 as above described, and the fuel cut-off operation of the fuel cut-off valve device 60 will open communication between the ahead control pipe 84 and pipe 55 so that fluid under pressure will be supplied to the upper face of the double check valve 57 in bracket 20 and to diaphragm chamber 44 in the ahead pilot valve device 21 associated with said bracket. At this time, however, the timing chamber 55a and diaphragm chamber 44 in the astern pilot valve device 19 will be charged with fluid under pressure previously supplied through the astern control pipe 45, and as a result, chamber 13 will also be charged with fluid under pressure, but the pressure of fluid in the timing chamber 55a and in diaphragm chamber 44 of the astern valve device 19 will be reducing at a slow rate through choke 64 in the check valve device 62. The double check valve 57 will, therefore, be subject on its upper side to pressure of fluid from the ahead control pipe 84 and on its lower side to pressure of fluid in the astern pipe 45 which latter pressure will be reducing while the former pressure may be increasing or may be increased to the value for effecting operation of the ahead pilot valve device 21 to supply fluid under pressure to chamber 12 at the left-hand face of the power piston 11. The power piston 11 will not move however with chamber 13 still charged wtih fluid under pressure.

However, as soon as the pressure of fluid in the astern pipe 45 effective on the lower face of the double check valve 57 becomes reduced to a certain degree with respect to the pressure of fluid in the ahead pipe 55 acting on the upper face of said double check valve, said double check valve will be shifted to its lower position for disconnecting the timing chamber 55a from the astern pilot valve device 19 and for opening said timing chamber to the ahead pilot valve device 21. After the timing chamber 55a is thus disconnected from the astern control pipe 45 prompt release of the remaining fluid pressure in diaphragm chamber 44 of the astern pilot valve device 19 will occur through choke 64 in check valve device 62 and consequently the astern pilot valve device will then operate to release the fluid under pressure from pressure chamber 13. The pressure of fluid in chamber 12 will then promptly operate piston 11 for effecting reversal of the valve gear or timing of the engine to provide for operation in the ahead direction. The operation of the other parts of the apparatus will then follow in the same manner as hereinbefore described.

The structure will also operate in the same manner as just described to expedite starting of the engine in the astern direction in case the operator after initiating ahead operation, suddenly desires astern operation and initiates same prior to release of fluid under pressure from the timing chamber 55a, as will be apparent.

It will now be seen that the single timing reservoir 55a is selectively effective through operation of the double check valve 57 to provide the desired delay in release of fluid under pressure from pressure chambers 13 or 12 after starting the engine in either one direction or in the opposite direction.

It will be further noted that upon operation of the control lever 175 to reverse the engine after operation to start it in one direction but prior to the release of fluid under pressure from the timing reservoir 55a, the double check valve 57 will operate to disconnect the timing reservoir 55a from the first operated valve device, so as to substantially eliminate the normally effective delay period in releasing the actuating fluid pressure from pressure chamber 12 or 13 and thus accelerate operation of the apparatus to start the engine in the newly selected direction.

Further this operation of the double check valve 57 to disconnect the timing reservoir 55a from the first operated ahead or astern pilot valve device or as soon as the control pressure provided to control the second operated one of said valve devices exceeds the reducing control pressure from the other of said valve devices avoids any material waste of the fluid pressure previously supplied to the timing reservoir 55a, and the pressure therein for controlling the said second one of said valve devices need then only be increased from that retained by operation of the double check valve 57 to the usual amount or degree.

*Summary*

From the above description it will now be noted that the control apparatus is automatically operable in response to selective operations of an operator's control lever to control the starting, stopping, reversing and fuel supply of a reversible internal combustion engine in a desired and necessary sequence. The reversing means for the engine comprises a power piston movable by fluid under pressure in either one direction or in the opposite direction, as provided by selective operation of either an ahead pilot valve device or an astern pilot valve device, and a timing reservoir is automatically connected to the one of said valve devices which is operated to provide for delaying for a certain interval of time release of fluid under pressure from the power piston in order to insure complete reversal of the reversing means of the engine and to ensure that said reversing means will be maintained in the reversed condition. The structure, however, provides for elimination of this delay period and thus a more rapid reversal of the engine under a condition where the operator might initiate starting of the engine in one direction and then suddenly desire that the engine operate in the opposite direction.

Having now described my invention, what I claim as new and desire to secure by Letters Patent is:

1. An apparatus for controlling the reversing of an internal combustion engine having reversing means operable to condition said engine for operation in either one direction or in the opposite direction comprising in combination, power means operable by fluid under pressure to effect operation of said reversing means to condition said engine for operation in a selected direction, valve means operable by fluid under pressure supplied to a chamber to supply fluid under pressure to said power means to effect operation thereof and operable upon release of fluid under pressure from said chamber to release fluid under pressure from said power means, manually operative means operable to supply fluid under pressure to said chamber, other valve means operable to release fluid under pressure from said chamber, and means operable upon conditioning of said reversing means to provide for operation of said engine in said reverse direction to effect operation of said other valve means.

2. An apparatus for controlling the reversing of an internal combustion engine having reversing means operable to condition said engine for operation in either one direction or in the opposite direction comprising in combination, power means operable by fluid under pressure to effect operation of said reversing means to condition said engine for operation in a selected direction, valve means operable by fluid under pressure supplied to a chamber to supply fluid under pressure to said power means to effect operation thereof and operable upon release of fluid under pressure from said chamber to release fluid under pressure from said power means, manually operative means operable to supply fluid under pressure to said chamber, other valve means operable to release fluid under pressure from said chamber, means operable upon conditioning of said reversing means to provide for operation of said engine in said reverse direction to effect operation of said other valve means, and means arranged to restrict the release of fluid under pressure from said chamber but providing for a more rapid rate of flow of fluid under pressure in the direction to said chamber.

3. An apparatus for controlling the reversing of an intternal combustion engine having reversing means operable to condition said engine for operation in either one direction or in the opposite direction comprising in combination, power means operable by fluid under pressure to effect operation of said reversing means to condition said engine for operation in a selected direction, valve means operable by fluid under pressure supplied to a chamber to supply fluid under pressure to said power means to effect operation thereof and operable upon release of fluid under pressure from said chamber to release fluid under pressure from said power means, manually operative means operable to supply fluid under pressure to said chamber, other valve means controlling communication between said manually operative means and said chamber and operable by fluid under pressure to close said communication and release fluid under pressure from said chamber, and means operable upon conditioning of said reversing means to provide for operation of said engine in said reverse direction to effect operation of said other valve means.

4. An apparatus for controlling the reversing of and supply of fuel to a reversible engine having reversing means adjustable to provide for operation of said engine in either one direction or in the opposite direction, said apparatus comprising in combination, power means operable by fluid under pressure to effect operation of said reversing means to provide for operation of said engine in a selected direction, valve means operable by fluid under pressure supplied to a chamber to supply fluid under pressure to said power means to effect operation thereof and operable upon release of fluid under pressure from said chamber to release fluid under pressure from said power means, manually operable means operable to supply fluid under pressure to said chamber, fuel control means for controlling supply of fuel to said engine, said power means being operable upon conditioning of said reversing means to provide for operation of said engine in said selected direction, to provide for operation of said fuel control means to supply fuel to said engine, and means operable upon operation of said fuel control means to supply fuel to said engine to close the fluid control communication between said manually operable means and said chamber and to release fluid under pressure from said chamber.

5. An apparatus for controlling the reversing of a reversible engine having reversing means adjustable to provide for operation of said engine in either one direction or in the opposite direction, said apparatus comprising in combination, a power piston operable by fluid under pressure supplied to act on one face to effect adjustment of said reversing means to provide for operation of said engine in one direction and operable by fluid under pressure supplied to act on the opposite face to effect adjustment of said reversing means to provide for operation of said engine in the opposite direction, a first valve means operable by fluid under pressure to supply fluid under pressure to said one face of said piston and operable upon release of fluid under pressure to release fluid under pressure from said one face of said piston, a second valve means operable by fluid under pressure to supply fluid under pressure to said opposite face of said piston and operable upon release of fluid under pressure to release fluid under pressure from said opposite face, manually operable means selectively operative to supply fluid under pressure to actuate either one of said valve means, and release means controlling the fluid pressure supply communication between said manually operable means and each of said valve means, said power means being operable upon conditioning of said reversing means to provide for operation of said engine in the selected direction, to effect operation of said release means to release fluid under pressure from the respective one of said valve means.

6. An apparatus for controlling the reversing means of a reversible internal combustion engine which means is adjustable to provide for operation of said engine in either one direction or in the opposite direction, and for also controlling operation of starting means for said engine and for further controlling the supply of fuel to said engine comprising in combination, power means operable by fluid under pressure to adjust said reversing means to provide for operation of said engine in a selected direction, manually operable means operative to provide fluid under pressure on said power means, said power means being operable upon said adjustment of said reversing means to effect operation of said starting means, fuel control means for said engine, means responsive to rotation of a rotatable part of said engine and operable upon rotation thereof in the direction provided for by said reversing means to effect operation of said fuel control means to supply fuel to said engine and operable to prevent supply of fuel to said engine with said engine stopped or turning in a direction opposite that provided for by said reversing means, and means operable upon operation of said fuel control means to supply fuel to said engine to cut off the supply of fluid under pressure to said power means and to release fluid under pressure therefrom.

7. An apparatus for controlling the reversing means of a reversible internal combustion engine which means is adjustable to provide for operation of said engine in either one direction or in the opposite direction, and for also controlling operation of starting means for said engine and for further controlling the supply of fuel to said engine comprising in combination, a power piston operable by fluid under pressure effective on one side to adjust said reversing means to provide for operation of said engine in one direction and operable by fluid under pressure effective on the opposite side to adjust said reversing means to provide for operation of said engine in the opposite direction, one valve means operable by fluid in a first chamber at a pressure exceeding a certain degree to effect a supply of fluid under pressure to act on one side of said piston and operable upon a reduction in pressure in said chamber to below said degree to release fluid under pressure from said one side of said piston, a second valve means operable by fluid in a second chamber at a pressure exceeding a certain degree to effect a supply of fluid under pressure to act on said opposite side of said piston and operable upon a reduction in pressure in said second chamber to below said certain degree to release fluid under pressure from said opposite side of said piston, manual means selectively operable to supply fluid under pressure to either one of said chambers while venting the other of said chambers, said reversing means being operable upon said adjustment by said piston to effect operation of said starting means, fuel control means for said engine, means responsive to rotation of a rotatable part of said engine and operative upon rotation thereof in the direction provided for by said reversing means to effect operation of said fuel control means to supply fuel to said engine and operative to prevent operation of said fuel control means to supply fuel to said engine with said engine stopped or operating in a direction the reverse of that provided for by said reversing means, and means operable upon operation of said fuel control means to supply fuel to said engine to release fluid under pressure from the respective one of said chambers.

8. An apparatus for controlling the reversing means of a reversible internal combustion engine which means is adjustable to provide for operation of said engine in either one direction or in the opposite direction, and for also controlling operation of starting means for said engine and for further controlling the supply of fuel to said engine comprising in combination, a power piston operable by fluid under pressure effective on one side to adjust said reversing means to provide for operation of said engine in one direction and operable by fluid under pressure effective on the opposite side to adjust said reversing means to provide for operation of said engine in the opposite direction, one valve means operable by fluid in a first chamber at a pressure exceeding a certain degree to effect a supply of fluid under pressure to act on one side of said piston and operable upon a reduction in pressure in said chamber to below said degree to release fluid under pressure from said one side of said piston, a second valve means operable by fluid in a second chamber at a pressure exceeding a certain degree to effect a supply of fluid under pressure to act on said opposite side of said piston and operable upon a reduction in pressure in said second chamber to below said certain degree to release fluid under pressure from said opposite side of said piston, manual means selectively operable to supply fluid under pressure to either one of said chambers while venting the other chamber, a timing volume, valve means controlling communication between said volume and both of said chambers and operable by a preponderance of pressure of fluid in either one of said chambers to open communication between the last named chamber and said volume and to close communication between said volume and the other chamber, fuel control means for said engine, means responsive to rotation of a rotatable part of said engine and operative upon rotation of said part in the direction provided for by said reversing means to effect operation of said fuel control means to supply fuel to said engine and operative to prevent supply of fuel to said engine with said engine stopped or operating in the direction the reverse of that provided for by said reversing means, and means operable upon operation of said fuel control means to supply fuel to said engine to release fluid under pressure from the respective one of said chambers supplied with fluid under pressure.

9. An apparatus for controlling the adjustment of an adjustable member comprising in combination with said member, movable abutment means operable by fluid under pressure to effect adjustment of said member, valve means operable by fluid under pressure supplied to a chamber to supply fluid under pressure to actuate said abutment means and operable upon a reduction in pressure of fluid in said chamber to a certain degree to release fluid under pressure from said abutment means, manually operable means operative to supply fluid under pressure to said chamber, and means controlled by said abutment means operable upon said adjustment of said member to close communication between said manually operable means and chamber and to release fluid under pressure from said chamber.

10. An apparatus for controlling the adjustment of an adjustable member comprising in combination with said member, movable abutment means operable by fluid under pressure to effect adjustment of said member, valve means operable by fluid under pressure supplied to a chamber to supply fluid under pressure to actuate said abutment means and operable upon a reduction in pressure of fluid in said chamber to a certain degree to release fluid under pressure from said abutment means, manually operable means operative to supply fluid under pressure to said chamber, means controlled by said abutment means operable upon said adjustment of said member to close communication between said manually operable means and chamber and to release fluid under pressure from said chamber, and means arranged to restrict the said release of fluid under pressure from said chamber and operable to provide for a more rapid flow of fluid under pressure from said manual means to said chamber.

11. A control apparatus comprising a power piston movable in one direction upon supply of fluid under pressure to one side and in the opposite direction upon supply of fluid under pressure to the opposite side, a first valve means operable upon supply of fluid under pressure to one chamber to supply fluid under pressure to said one side of said piston and operable upon release of fluid under pressure from said chamber to release fluid under pressure from said one side of said piston, a second valve means operable upon supply of fluid under pressure to a second chamber to supply fluid under pressure to said opposite side of said piston and operative upon release of fluid under pressure from said second chamber to release fluid under pressure from said opposite side of said piston, a timing volume, a double check valve controlling communication between said volume and chambers and operable by a preponderance in pressure of fluid in either one of said chambers to open said volume to that chamber and to close communication between said volume and the other chamber, and control means operable to supply fluid under pressure to either one of said chambers and at the same time to provide for release of fluid under pressure from the other chamber.

12. A control apparatus comprising a power piston movable in one direction upon supply of fluid under pressure to one side and in the opposite direction upon supply of fluid under pressure to the opposite side, a first valve means operable upon supply of fluid under pressure to one chamber to supply fluid under pressure to said one side of said piston and operable upon release of fluid under pressure from said chamber to release fluid under pressure from said one side of said piston, a second valve means operable upon supply of fluid under pressure to a second chamber to supply fluid under pressure to said opposite side of said piston and operative upon release of fluid under pressure from said second chamber to release fluid under pressure from said opposite side of said piston, a timing volume, a double check valve controlling communication between said volume and chambers and operable by a preponderance in pressure of fluid in either one of said chambers to open said volume to that chamber and to close communication between said volume on the other chamber, control means operable to supply fluid under pressure to either one of said chambers and at the same time to provide for release of fluid under pressure from the other chamber, and means in the communication between said control means and each of said chambers operable to provide for relatively rapid flow of fluid under pressure from said control means to said chambers and operable to restrict release of fluid under pressure from said chamber.

ROY R. STEVENS.